United States Patent
Tseng et al.

(10) Patent No.: US 10,296,228 B2
(45) Date of Patent: May 21, 2019

(54) LOW CAPACITY LATENCY STORAGE ENCLOSURE WITH LOGIC DEVICE

(71) Applicant: Super Micro Computer, Inc., San Jose, CA (US)

(72) Inventors: Kelvin Tseng, San Jose, CA (US); Trina Shih, San Francisco, CA (US); Lawrence H. Liang, San Jose, CA (US); Richard Chen, San Jose, CA (US)

(73) Assignee: SUPER MICRO COMPUTER, INC., San Jose, CA (US)

( * ) Notice: Subject to any disclaimer, the term of this patent is extended or adjusted under 35 U.S.C. 154(b) by 0 days.

(21) Appl. No.: 15/132,135

(22) Filed: Apr. 18, 2016

(65) Prior Publication Data

US 2017/0300237 A1    Oct. 19, 2017

(51) Int. Cl.
   *G06F 3/06*  (2006.01)
   *G06F 13/40* (2006.01)
   *G06F 13/20* (2006.01)
   *G06F 13/16* (2006.01)

(52) U.S. Cl.
   CPC .......... *G06F 3/0611* (2013.01); *G06F 3/0629* (2013.01); *G06F 3/0689* (2013.01); *G06F 13/16* (2013.01); *G06F 13/20* (2013.01); *G06F 13/4068* (2013.01)

(58) Field of Classification Search
   CPC . G06F 13/00; G06F 13/161; G06F 2212/1024
   USPC .......................................................... 710/2
   See application file for complete search history.

(56) References Cited

U.S. PATENT DOCUMENTS

| | | | | |
|---|---|---|---|---|
| 8,471,736 B1* | 6/2013 | Booth | ......... | G04F 10/005 327/105 |
| 2006/0206632 A1* | 9/2006 | Chiasson | ......... | G06F 3/0626 710/20 |
| 2008/0082747 A1* | 4/2008 | Islam | ......... | G06F 11/201 711/114 |
| 2008/0307130 A1* | 12/2008 | Chang | ......... | G06F 3/061 710/74 |
| 2009/0187707 A1* | 7/2009 | Benhase | ......... | G06F 3/0607 711/114 |
| 2013/0111094 A1* | 5/2013 | Culter | ......... | G06F 13/00 710/300 |
| 2013/0219101 A1* | 8/2013 | Hansen | ......... | G06F 3/0626 710/313 |

* cited by examiner

*Primary Examiner* — Farley Abad
*Assistant Examiner* — Getente A Yimer
(74) *Attorney, Agent, or Firm* — Artegis Law Group, LLP

(57) ABSTRACT

A storage enclosure includes a plurality of hard drive sub-boards, each configured to include a plurality of hard drives. Each hard drive sub-board is coupled to one or more expanders, via and interface unit, with a set of dual-pass shielded cables. The expander includes a plurality of chipsets coupled to a complex logic device. Each chipset may communicate with a different subset of hard drives with potentially different timing characteristics. The dual-pass shielded cables may be arranged to mitigate these differences. In addition, pin assignments associated with the cables may be set in order to further mitigate the timing differences.

20 Claims, 9 Drawing Sheets

LOW CAPACITY LATENCY STORAGE ENCLOSURE WITH LOGIC DEVICE

BACKGROUND OF THE INVENTION

Field of the Invention

Embodiments of the present invention relate generally to storage enclosures, and, more specifically, to low latency storage enclosure with large capacity.

Description of the Related Art

A conventional storage enclosure includes an expander coupled to an interface unit that, in turn, is coupled to a single large printed circuit board (PCB). The single large PCB includes a collection of ports for mounting hard drives. The PCB includes a set of traces that couple the hard drives to the interface unit and, in turn, to the expander. The expander may be coupled to a host computer system and receive input/output (I/O) commands from that host computer. The expander transmits these commands to the interface unit. The interface unit includes routing circuitry that routes I/O commands from the expander to specific PCB traces, thereby providing access to individual hard drives.

One drawback of the configuration described above is that the routing circuitry within the interface unit includes a rather complex arrangement of traces that tends to induce crosstalk. For example, a storage enclosure with 30 hard drives could include routing circuitry with 30 or more locations where traces cross over one another. The crosstalk not only can degrade the quality of the signals transmitted via the traces, the crosstalk also limits the number of hard drives that can be included in the storage enclosure, because the crosstalk increases as the number of hard drives included in the storage enclosure increases. Thus, if too many hard drives are included in the storage disclosure, then the crosstalk within the interface can increase beyond acceptable levels. Consequently, a conventional storage enclosure typically includes 30 or fewer hard drives.

Another drawback of the convention storage enclosure configuration described above is that the PCB traces within the single large PCB also induce crosstalk, which further limits the number of drives that can be included within the storage enclosure. Further, if the traces within the large PCB exceed a certain length, then the quality of the signals transmitted via those traces can significantly degrade. This constraint limits the size of the PCB, and, in turn, the number of hard drives that the PCB can support.

Yet another drawback of the above configuration is that the complex routing scheme implemented to properly couple all of the hard drives to the interface unit via the PCB traces creates timing differences in signals that are transmitted to different hard drives. For example, a first hard drive with relatively simple routing that is positioned relatively close to the interface unit receives I/O commands much sooner than a second hard drive with more complex routing and positioned relatively far away from the interface unit. These timing differences can make synchronization between hard drives difficult or impossible. Generally, reducing the number of drives in the storage enclosure is one way to reduce the complexity of the routing scheme in order to mitigate such timing differences.

As the foregoing illustrates, what is needed in the art is a storage enclosure design capable of supporting a larger number of hard drives than conventional enclosure designs.

SUMMARY OF THE INVENTION

One embodiment of the present invention sets forth a storage enclosure, including a first expander configured to receive input/output (I/O) data from a host computer system, and a plurality of hard drives coupled to the first expander via a plurality of cables, wherein the plurality of cables routes the I/O data between the first expander and the plurality of hard drives to perform memory access operations.

At least one advantage of the disclosed approach is that the storage enclosure may support a greater number of hard drives than possible with conventional approaches. Specifically, the dual-pass cables are shielded, and so crosstalk may be reduced significantly compared to previous approaches that rely on PCB traces.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
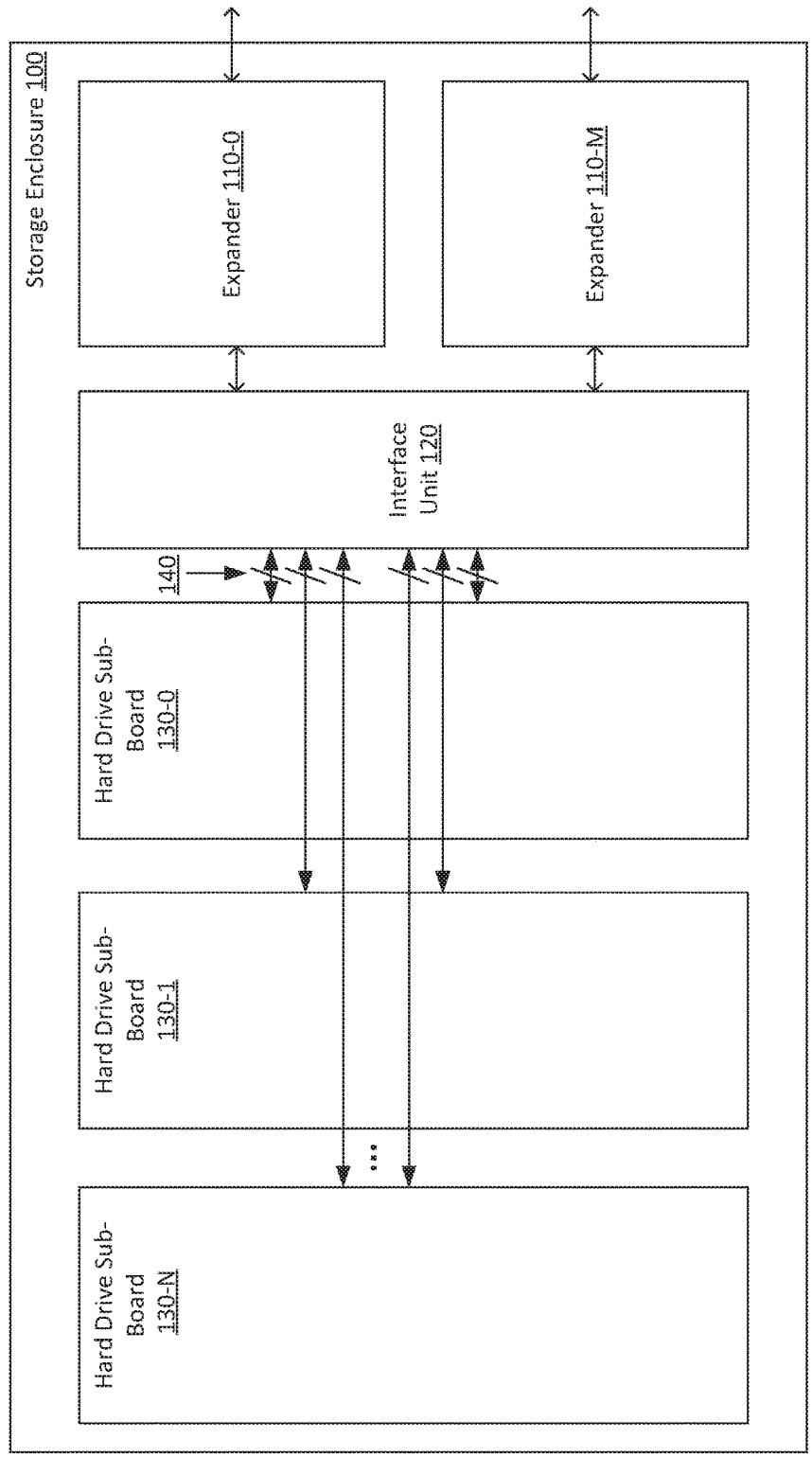
FIG. 1 is a block diagram of a storage enclosure, according to various embodiments of the present invention.

FIG. 1 is a block diagram of a storage enclosure, according to various embodiments of the present invention. As shown, storage enclosure 100 includes a plurality of expanders 110-0 through 110-M, an interface unit 120, and a plurality of hard drive sub-boards 130-0 through 130-N, each configured to include a plurality of hard drives (not shown here). Expanders 110 are coupled to interface unit 120, and interface unit 120 is coupled to hard drive sub-boards 130. Expanders 110 include a plurality of plugs (not shown) which couple directly to interface unit 120. Interface unit 120 is coupled to each hard drive sub-board 130 via a set of cables 140. Cables 140 may include multiple different subsets of cables, where each subset is coupled to a different hard drive sub-board, as described in greater detail below in conjunction with FIGS. 7-9. Storage enclosure 100 may include any number of expanders 110, although in one implementation, storage enclosure 100 includes two expanders. Similarly, storage enclosure 100 may include any number of hard drive sub-boards 130, although in one implementation, storage enclosure 100 includes three hard drive sub-boards 130.

In operation, expanders 110 transport I/O data to and from a host computer system (not shown) coupled upstream of those expanders. As referred to herein, "I/O data" generally includes input commands and associated write data or output commands and associated read data. Expanders 110 include various circuitry configured to transport the I/O data to and from specific ports within interface unit 120. An exemplary expander 110 is discussed in greater detail below in conjunction with FIG. 5.

Interface unit 120 receives I/O data from expanders 110 and then transmits that data along cables 140 to specific hard drives within hard drive sub-boards 130. Interface unit 120 may also receive I/O data from the hard drives within hard drive sub-boards 130 via cables 140 and then provide that data to expanders 110 for transmission to the host computer system. When transporting I/O data, interface unit 130 implements a signal mapping procedure to map specific signal pins of interface unit 120 to specific signal wires within cable 140. The specific signal mapping for a given cable 140 may mitigate latency issues or improve signal timing for the associated hard drive. Interface unit 120 is described in greater detail below in conjunction with FIG. 4.

Each hard drive sub-board 130 includes a plurality of hard drive groups (not shown here). Each hard drive group includes a set of hard drives. A given hard drive group performs a signal remapping procedure with the corresponding cable 140 to remap specific signal wires of a cable 140 to specific signal pins associated with the hard drives in the group. Generally, the signal remapping procedure implemented within a hard drive group is complementary to the signal mapping procedure performed by interface unit 120, for a given cable 140. An exemplary hard drive sub-board 130 and an exemplary hard drive group are described in greater detail below in conjunction with FIGS. 2-3.

Figure 2:
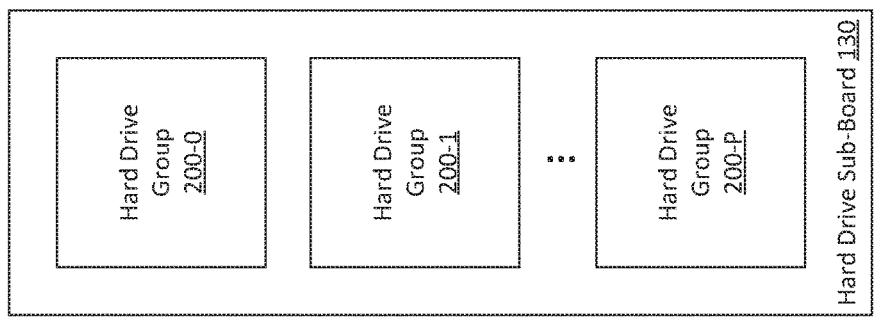
FIG. 2 is a block diagram of a hard drive sub-board within the storage enclosure of FIG. 1, according to various embodiments of the present invention.

FIG. 2 is a block diagram of a hard drive sub-board within the storage enclosure of FIG. 1, according to various embodiments of the present invention. As shown, hard drive sub-board 130 includes hard drive groups 200-0 through 200-P. Hard drive sub-board 130 may include any number of hard drive groups, although in one implementation, hard drive sub-board 130 includes five hard drive groups 200.

Figure 3:
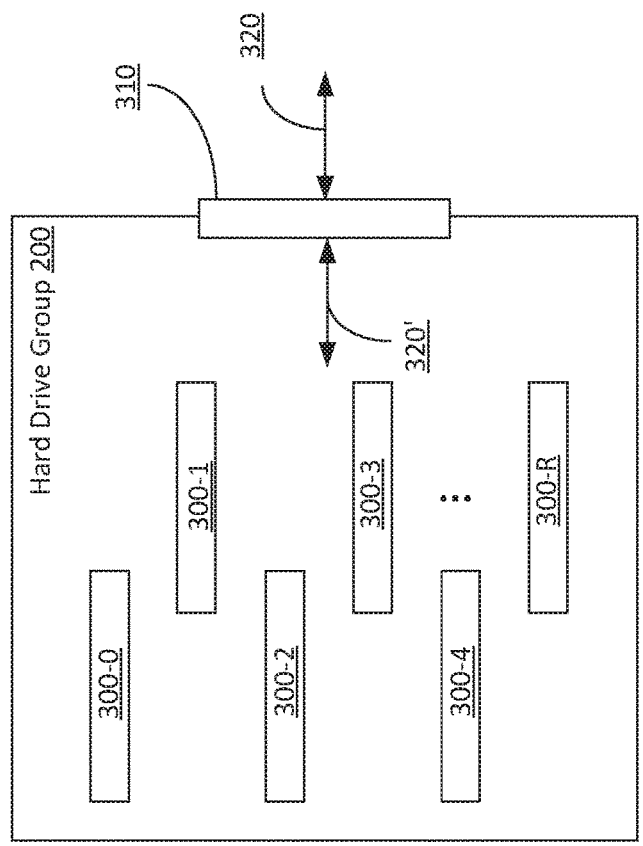
FIG. 3 is a block diagram of a hard drive group within the disk sub-board of FIG. 2, according to various embodiments of the present invention.

FIG. 3 is a block diagram of a hard drive group within the disk sub-board of FIG. 2, according to various embodiments of the present invention. As shown, disk group 200 includes hard drives 300-0 through 300-R and signal remapping unit 310. Hard drives 300 may be any technically feasible variety of computer-readable/writable memory, including a hard disk drive (HDD), a solid-state drive (SSD), and so forth. Signal remapping unit 310 is coupled to one or more cables 140, and to remap signal wire assignment 320 associated with cables 140 to signal pin assignment 320'. In this fashion, signal remapping unit 310 receives I/O data via cables 140, performs a signal remapping, and then forwards the received I/O data to hard drives 300. Hard drives 300 may respond with other I/O data, and then signal remapping unit 310 performs the reverse signal remapping, and forwards the I/O data to interface unit 120 via cables 140.

Figure 4:
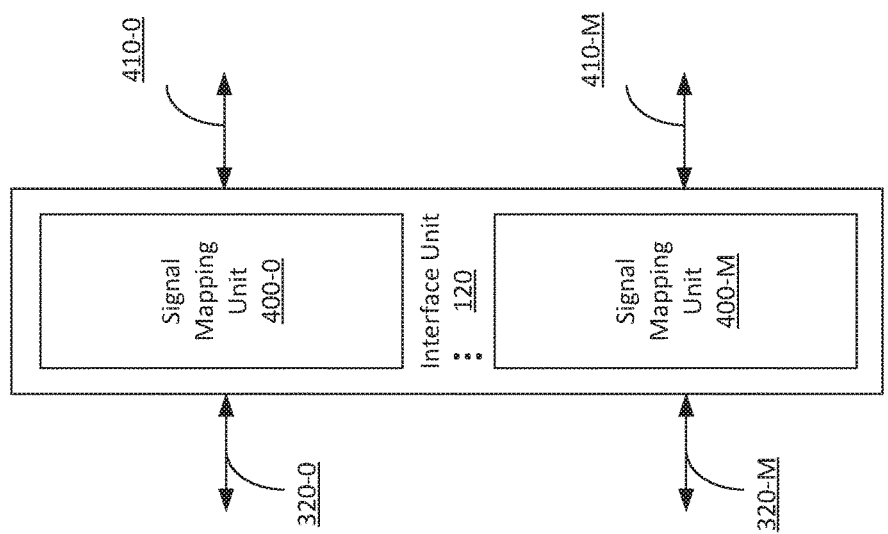
FIG. 4 is a block diagram of an interface unit within the storage enclosure of FIG. 1, according to various embodiments of the present invention.

FIG. 4 is a block diagram of an interface unit within the storage enclosure of FIG. 1, according to various embodiments of the present invention. As shown, interface unit 120 includes a plurality of signal mapping units 400-0 through 400-M. Generally, the number of signal mapping units 400 is equal to the number of expanders 110 included in storage enclosure 100. Each signal mapping unit 400 receives I/O data via a set of plugs within interface unit 120 that have a signal pin assignment 410. Each signal mapping unit 400 then performs a signal remapping procedure to map those signal pins to specific signal wires within cables 140. Cables 140 generally have signal wire assignment 320, as discussed above in conjunction with FIG. 3. Interface unit 120 performs the signal mapping procedure discussed above in order to minimize latencies during transmission across cables 140 and/or to minimize the length of cables 140. The specific signal mappings used may vary across cables 140, and may be determined via any technically feasible approach. In one embodiment, the signal mapping for each different cable 140 is generated based on empirical data and/or simulation data.

Figure 5:
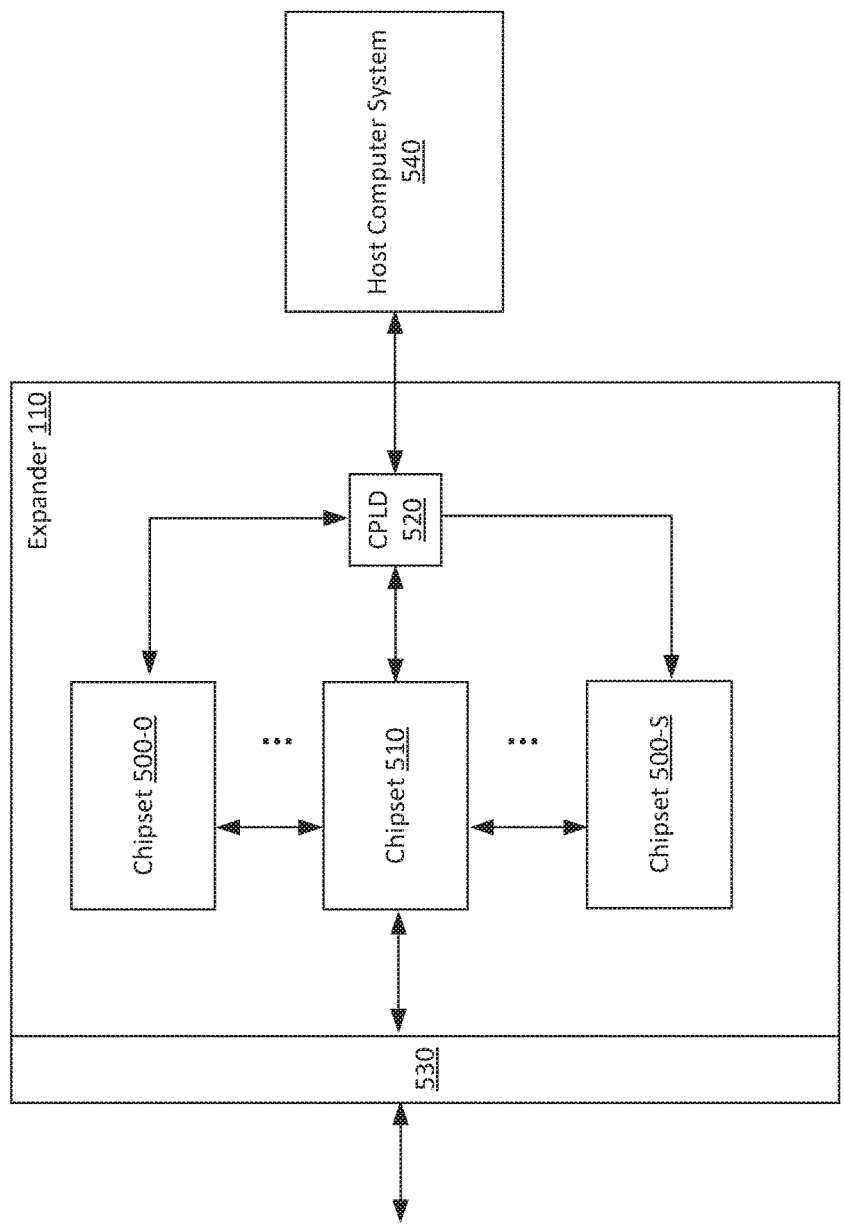
FIG. 5 is a block diagram of an expander within the storage enclosure of FIG. 1, according to various embodiments of the present invention.

FIG. 5 is a block diagram of an expander within the storage enclosure of FIG. 1, according to various embodiments of the present invention. As shown, expander 110 includes peripheral chipsets 500-0 though 500-S, central chipset 510, complex logic device (CPLD) 520, and ports 530. In one embodiment, CPLD 520 may be implemented by a field-programmable gate array (FPGA) or any other type of processing unit or logic device. CPLD 520 is configured to receive I/O data from a host computer system 540 and to transmit that data to chipsets 500 and 510. Each of chipsets 500 and 510 generally processes I/O data for a different subset of hard drives 300 within storage enclosure 100. In doing so, a given chipset 500 or 510 may forward write commands and write data to a particular subset of hard drives 300, or transmit read commands to the subset of hard drives 300 and receive read data in response to those commands. In one embodiment, chipset 500-0 processes I/O data for 39 hard drives 300, chipset 500-S processes I/O commands for 39 other hard drives 300, and chipset 510 processes I/O commands for 12 remaining hard drives 300. Chipsets 500-0 and 500-S route I/O data via chipset 510 to and from ports 530. Chipset 510 routes I/O data directly to and from ports 530. Ports 530 are generally I/O ports coupled to plugs in interface unit 120.

In the configuration shown, I/O data routed from the host computer system through chipset 510 may be delivered to the relevant hard drive 300 faster than I/O commands routed through chipsets 500, because chipset 500 is coupled directly to ports 530. Conversely, I/O data routed through chipsets 500 may be delivered to the relevant hard drive slower than I/O data routed through chipset 510, because chipsets 500 are not coupled directly to ports 530. This arrangement may cause timing differences between I/O data routed to different hard drives and/or cause latencies that may affect performance. However, in order to compensate for these differences, chipset 510 may be coupled to a subset of hard drives 300 that are relatively farther from expander 110 compared to another subset of hard drives 300 to which chipsets 500 are coupled. Thus, in operation, I/O commands routed through chipsets 500 and 510 may have similar timing and/or latencies.

In one embodiment, chipset 510 and a subset of cables 140 forms a first data pathway between CPLD 520 and a subset of hard drives 300, while chipset 510, one of chipsets 500, and another subset of cables 140 forms a second data pathway between CPLD 520 and another subset of hard drives 300. In this embodiment, the routing of the different subsets of cables may be tailored to compensate for the latency differences incurred by chipset 510 versus chipsets 500, potentially equalizing the overall latencies of those data pathways, as also discussed in greater detail below in conjunction with FIGS. 7-9.

Figure 6:
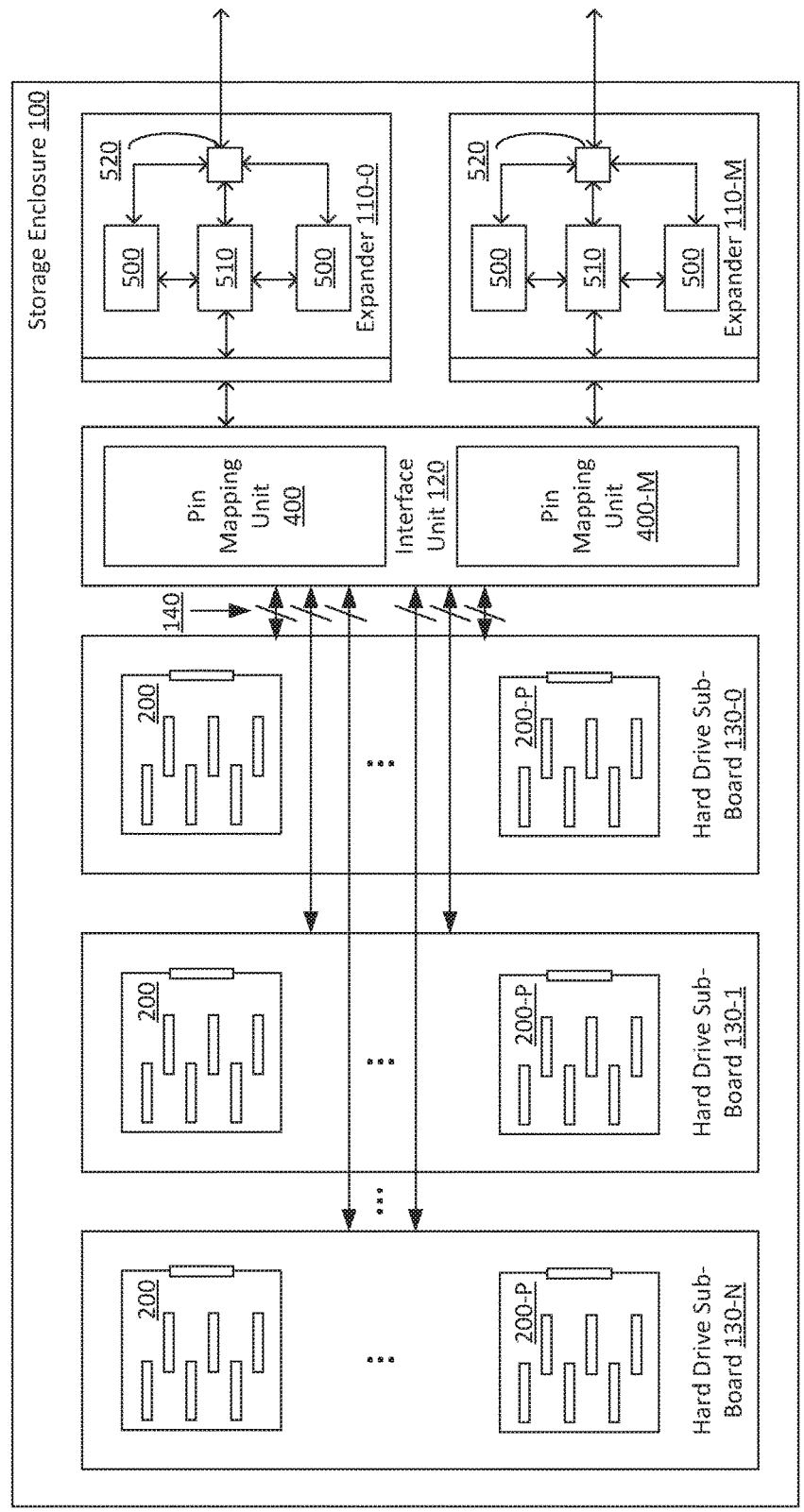
FIG. 6 is a more detailed block diagram of the storage enclosure of FIG. 1, according to various embodiments of the present invention.
Figure 7:
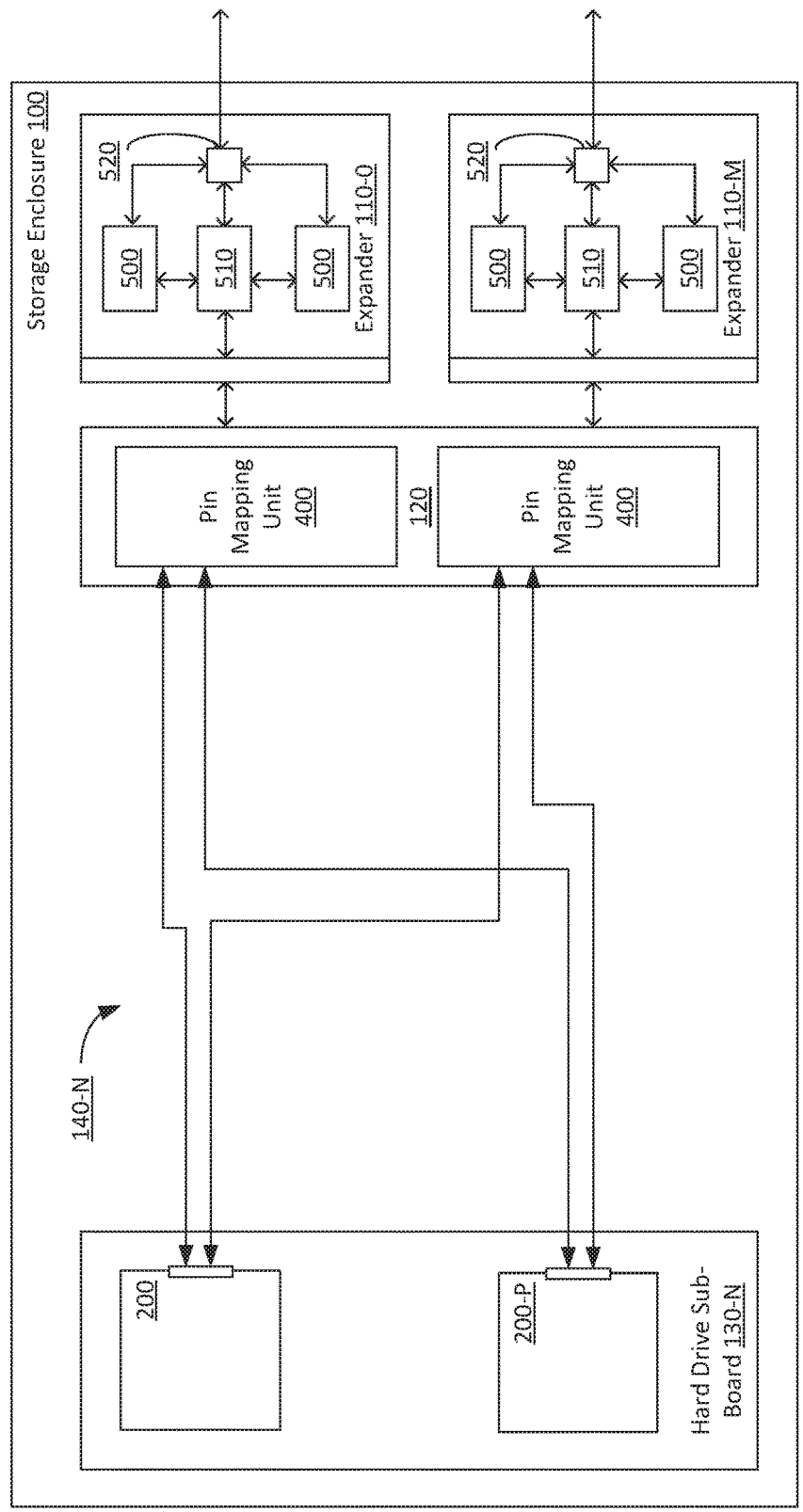
FIG. 7 is a block diagram of a set of cables configured to implement I/O data routing within the storage enclosure of FIG. 1, according to various embodiments of the present invention.
Figure 8:
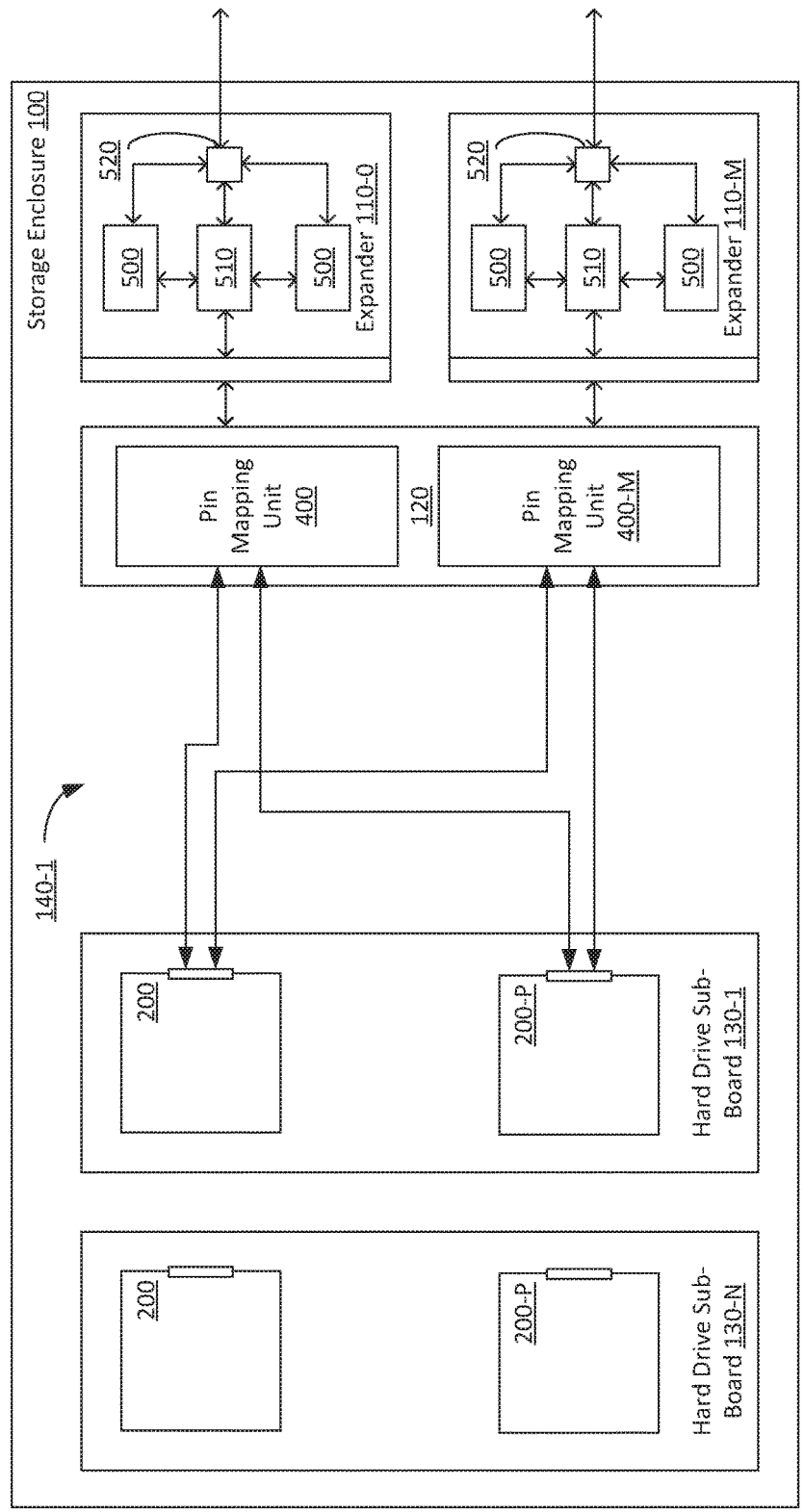
FIG. 8 is a block diagram of another set of cables configured to implement I/O data routing within the storage enclosure of FIG. 1, according to various embodiments of the present invention.
Figure 9:
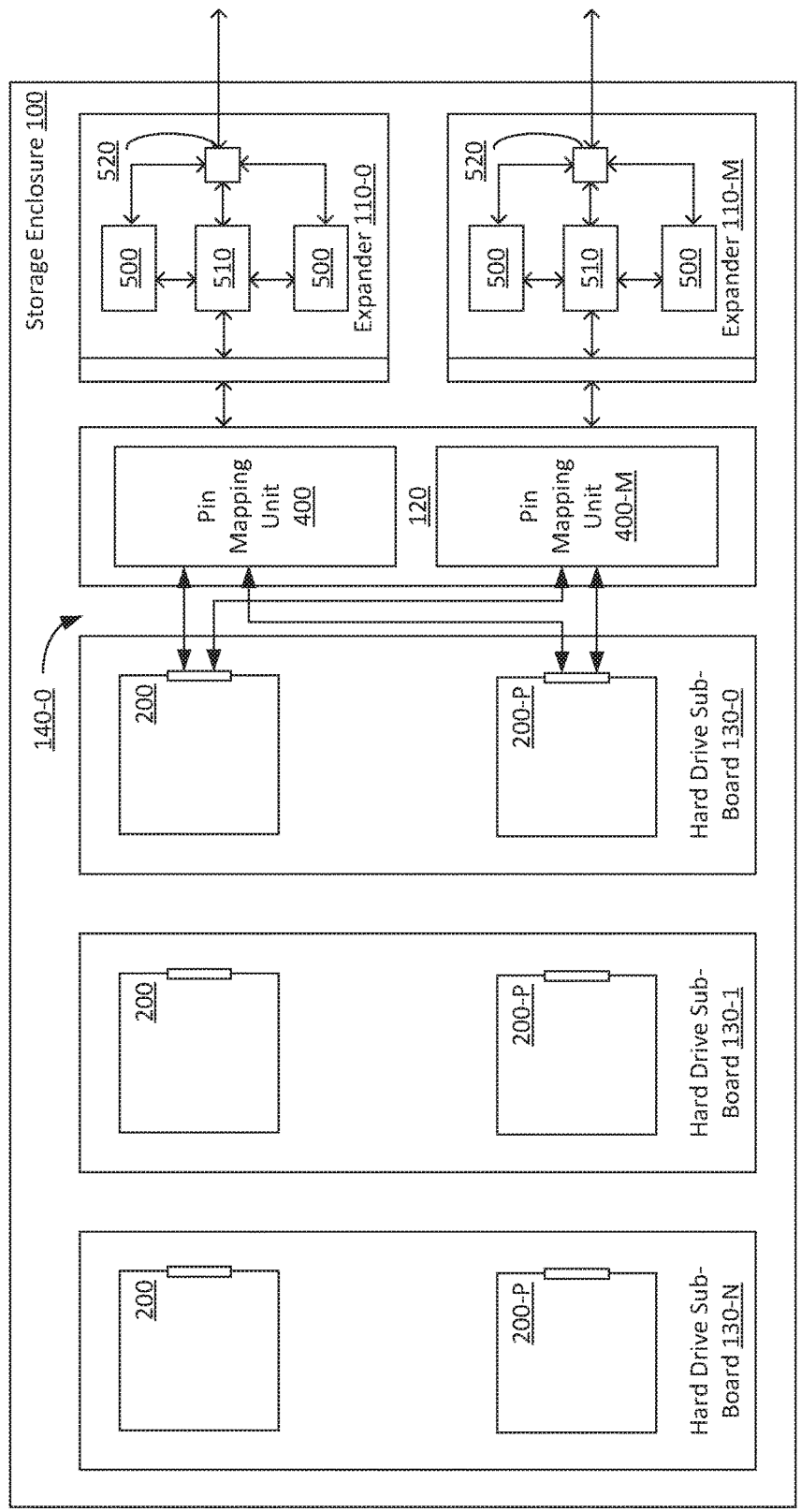
FIG. 9 is a block diagram of yet another set of cables configured to implement I/O data routing within the storage enclosure of FIG. 1, according to various embodiments of the present invention.

FIG. 6 is a more detailed block diagram of the storage enclosure of FIG. 1, according to various embodiments of the present invention. As shown, storage enclosure 100 includes the various components described in detail in conjunction with FIGS. 1-5. Cables 140 are configured to couple interface unit 120 to each hard drive sub-board 130, each hard drive group 200, and each hard drive 300. In one implementation, cables 140 include multiple shielded dual-pass cables configured to implement specific routing and signal assignments that balance timing differences across the various cables. FIGS. 7-9 illustrate exemplary cables that couple hard drives 300 within each of the different hard drive sub-boards 130 to interface unit 120.

FIG. 7 is a block diagram of a set of cables configured to implement I/O data routing within the storage enclosure of FIG. 1, according to various embodiments of the present invention. As shown, hard drive sub-board 130-N is coupled to interface unit 120 via cables 140-N. Specifically, cables 140-N couple signal mapping units 400 and 400-M to hard drive groups 200 and 200-P within hard drive sub-board 130-N. Since hard drive sub-board 130-N is located at the far end of storage enclosure 100 relative to expanders 110, hard drive sub-board 130-N may be coupled to and configured to transmit and receive I/O data to and from chipset 510 as opposed to chipsets 500. Again, chipset 510 within a given expander 110 is coupled directly to ports 530, and may thus transport I/O data faster than chipsets 500. Thus, hard drive sub-board 130-N is coupled to chipset 500 to reduce latency potentially incurred by the distant placement of hard drive sub-board 130-N relative to expanders 110. In addition, the specific signal mappings implemented in cables 140-N may be tailored to minimize and/or equalize cable length and generally improve the ability of interface unit 120 to communicate with hard drive sub-board 130-N.

FIG. 8 is a block diagram of another set of cables configured to implement I/O data routing within the storage enclosure of FIG. 1, according to various embodiments of the present invention. As shown, hard drive sub-board 130-1 is coupled to interface unit 120 via cables 140-1. Specifically, cables 140-1 couple signal mapping units 400 and 400-M to hard drive groups 200 and 200-P within hard drive sub-board 130-1. Since hard drive sub-board 130-1 is located in the middle of storage enclosure 100 relative to expanders 110, hard drive sub-board 130-1 may be coupled to and configured to transmit and receive I/O data to and from either of chipsets 510 and/or chipsets 500. In addition, the specific pin mappings implemented in cables 140-1 may be tailored to minimize cable length and generally improve the ability of interface unit 120 to communicate with hard drive sub-board 130-1.

FIG. 9 is a block diagram of yet another set of cables configured to implement I/O data routing within the storage enclosure of FIG. 1, according to various embodiments of the present invention. As shown, hard drive sub-board 130-0 is coupled to interface unit 120 via cables 140-0. Specifically, cables 140-0 couple signal mapping units 400 and 400-M to hard drive groups 200 and 200-P within hard drive sub-board 130-0. Since hard drive sub-board 130-0 is located close to expanders 110, hard drive sub-board 130-0 may be coupled to and configured to transmit and receive I/O data from chipsets 500 without incurring significant latency penalties. In addition, the specific signal mappings implemented in cables 140-0 may be tailored to minimize cable length and generally improve the ability of interface unit 120 to communicate with hard drive sub-board 130-0.

Referring generally to FIGS. 7-9, the exemplary cable mappings shown in these Figures are exemplary in nature and not meant to be limiting. Persons skilled in the art will recognize that cables 140 may generally be distributed in such a fashion that the transmission of I/O data across those cables is minimized and/or equilibrated across multiple different cables 140. In addition, the signal mapping techniques described above in conjunction with FIGS. 3-4 may also be implemented to further improve the timing characteristics of I/O data transported via cables 140.

In sum, a storage enclosure includes a plurality of hard drive sub-boards, each configured to include a plurality of hard drives. Each hard drive sub-board is coupled to one or more expanders, via and interface unit, with a set of dual-pass shielded cables. The expander includes a plurality of chipsets coupled to a complex logic device. Each chipset may communicate with a different subset of hard drives with potentially different timing characteristics. The dual-pass shielded cables may be arranged to mitigate these differences. In addition, pin assignments associated with the cables may be set in order to further mitigate the timing differences.

One advantage of the approach described above is that the storage enclosure may support a greater number of hard drives than possible with conventional approaches. Specifically, the dual-pass cables are shielded, and so crosstalk may be reduced significantly compared to previous approaches that rely on PCB traces. This feature also allows the cables to be much longer than conventional PCB traces without significant signal degradation. Thus, more hard drives may be included in the storage enclosure. In addition, the routing from the expanders to the hard drive groups may occur via appropriate routing of cables, and so the interface unit need not include complex routing circuitry, thereby further reducing crosstalk. Finally, in architectures that involve multiple chipsets with potentially different timing characteristics, those timing differences can be reduced or eliminated via specific cable routings and pin assignments. These various advantages allow the storage enclosure to be larger, and therefore support more hard drives.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A storage enclosure, comprising:
an expander configured to route input/output (I/O) data associated with a host computer system and including:
a first logic device,
a central chipset coupled to the first logic device, and
a peripheral chipset coupled to the first logic device and to the central chipset;
a first subset of hard drives coupled to the first logic device via a first data pathway including the central chipset; and
a second subset of hard drives coupled to the first logic device via a second data pathway including the central chipset and the peripheral chipset,
wherein the first data pathway transports I/O data from the expander to the first subset of hard drives with a first transmission latency, and
wherein the second data pathway transports I/O data from the expander to the second subset of hard drives with a second transmission latency that is lower than the first transmission latency by an amount associated with a time delay caused by routing I/O data between the central chipset and the peripheral chipset.

2. The storage enclosure of claim 1, wherein the first data pathway further includes a first set of cables, and wherein the central chipset is configured to transport a first portion of the I/O data to the first set of cables with a first latency, and the first set of cables is configured to transport the first portion of the I/O data to the first subset of hard drives with the first transmission latency.

3. The storage enclosure of claim 2, wherein the second data pathway further includes a second set of cables, and wherein the central chipset and the peripheral chipset are configured to transport a second portion of the I/O data to the second set of cables with a third latency, and the second set of cables is configured to transport the second portion of the I/O data to the second subset of hard drives with the second transmission latency.

4. The storage enclosure of claim 3, wherein the sum of the first latency and the first transmission latency is approximately equal to the sum of the third latency and the second transmission latency.

5. The storage enclosure of claim 3, wherein the expander further includes a set of I/O ports coupled to the first set of cables and to the second set of cables, and wherein the set of I/O ports is coupled directly to the central chipset and coupled indirectly to the peripheral chipset via the central chipset.

6. The storage enclosure of claim 1, wherein the first subset of hard drives is connected to a first hard drive sub-board, and the second subset of hard drives is connected to a second hard drive sub-board.

7. The storage enclosure of claim 6, wherein the first hard drive sub-board is located farther away from the expander than the second hard drive sub-board.

8. The storage enclosure of claim 1, wherein both the first subset of hard drives and the second subset of hard drives are connected to a first hard drive sub-board.

9. The storage enclosure of claim 8, wherein the first subset of hard drives is located farther away from the expander than the second subset of hard drives.

10. The storage enclosure of claim 1, wherein the logic device is configured to distribute the I/O data to the central chipset and to the peripheral chipset for transmission to the first subset of hard drives and the second subset of hard drives.

11. An expander configured to route input/output (I/O) data associated with a host computer system and including:

a first logic device;

a central chipset coupled to the first logic device; and a peripheral chipset coupled to the first logic device and to the central chipset, wherein a first subset of hard drives are coupled to the logic device via a first data pathway including the central chipset, and a second subset of hard drives are coupled to the logic device via a second data pathway including the central chipset and the peripheral chipset, wherein a first data pathway transports I/O data from the expander to a first subset of hard drives with a first latency, and wherein a second data pathway transports I/O data from the expander to a second subset of hard drives with a second latency that is lower than the first latency by an amount associated with a time delay caused by routing I/O data between the central chipset and the peripheral chipset.

12. The expander of claim 11, wherein the first data pathway further includes a first set of cables, and wherein the central chipset is configured to transport a first portion of the I/O data to the first set of cables with a first latency, and the first set of cables is configured to transport the first portion of the I/O data to the first subset of hard drives with the first transmission.

13. The expander of claim 12, wherein the second data pathway further includes a second set of cables, and wherein the central chipset and the peripheral chipset are configured to transport a second portion of the I/O data to the second set of cables with a third latency, and the second set of cables is configured to transport the second portion of the I/O data to the second subset of hard drives with the second transmission latency.

14. The expander of claim 13, wherein the first data pathway and the second data pathway have substantially the same length.

15. The expander of claim 11, wherein the first data pathway includes fewer junctions between chipsets than the second data pathway.

16. The expander of claim 11, wherein the first subset of hard drives is connected to a first hard drive sub-board, and the second subset of hard drives is connected to a second hard drive sub-board.

17. The expander of claim 16, wherein the first hard drive sub-board is located farther away from the expander than the second hard drive sub-board.

18. The expander of claim 11, wherein both the first subset of hard drives and the second subset of hard drives are connected to a first hard drive sub-board.

19. The expander of claim 18, wherein the first subset of hard drives is located farther away from the expander than the second subset of hard drives.

20. The expander of claim 11, wherein the logic device is configured to distribute the I/O data to the central chipset and to the peripheral chipset for transmission to the first subset of hard drives and the second subset of hard drives.

* * * * *